United States Patent [19]
Gasior et al.

[11] 3,753,637
[45] Aug. 21, 1973

[54] COOLED-CUTTER HOT-DIE PELLETIZER
[75] Inventors: Joseph Gasior, Bloomfield; Anthony W. Pomper, Edison, both of N.J.
[73] Assignee: Midland-Ross Corporation, Cleveland, Ohio
[22] Filed: Feb. 14, 1972
[21] Appl. No.: 225,993

[52] U.S. Cl.................. 425/313, 83/168, 83/170, 83/171, 425/378
[51] Int. Cl............................................ B29c 17/14
[58] Field of Search.................. 425/378, 313, 310, 425/315, 378, 445; 83/15, 16, 168, 169, 170, 171

[56] References Cited
UNITED STATES PATENTS

| | | |
|---|---|---|
| 3,230,582 | 1/1966 | Hoffman et al................. 425/378 X |
| 3,323,170 | 6/1967 | Swickard, Jr. et al.......... 425/378 X |
| 3,324,510 | 6/1967 | Kleeb................................ 425/310 |
| 3,349,433 | 10/1967 | Schippers et al.............. 425/313 X |
| 3,415,917 | 12/1968 | Watanabe et al............... 425/313 X |
| 3,608,142 | 9/1971 | Miler.............................. 425/378 X |

Primary Examiner—Richard B. Lazarus
Attorney—Woodrow W. Portz

[57] ABSTRACT

Described herein is apparatus for pelletizing thermoplastic extrudable materials utilizing a fish-tail type die and a rotating-cylinder type cutter wherein cooling of the cutter is effected without cooling of the die.

8 Claims, 5 Drawing Figures

Patented Aug. 21, 1973

COOLED-CUTTER HOT-DIE PELLETIZER

BACKGROUND OF THE INVENTION

A system of pelletizing equipment in prevalent use for modest scale yields, such as 1,000 to 1,500 pounds per hour, extrudes a bundle of strands into a water trough for cooling and hardening. The strands then pass into the ambit of a rotating knife cutter which reduces the strands to pellets. The cutting operation is very noisy and usually produces unwanted "fines," i.e., small particles and dust. The noise is particularly obnoxious. Startups or shutdowns involve significant labor. Constant operator attention is required because of the shutdowns and relacing or "threading up" of the equipment entailed in strand breakage.

Underwater pelletizers are used for higher production rates, e.g., 5,000 to 10,000 pounds per hour, but are of expensive construction and have operating problems such as keeping the die face hot enough that the plastic does not freeze in the die holes. The use of complicated steam heated die faces reduces but does not eliminate underheating and overheating difficulties arising out of extruding various types of plastics through a die submerged in a liquid.

Objects of the invention include (1) to operate pelletizer equipment wherein a cutter rotates in proximity with a die face to cut the issuing plastic while in a hot condition and to efficiently cool and lubricate the cutter without cooling the die face, (2) avoiding the noise of operation and strand breakage incident to conventional commonly used pelletizing equipment, (3) avoiding "threading up" procedures as required with conventional strand-comminuting equipment, (4) avoiding the need for closely controlled liquid coolant or water temperature, (5) providing pelletizing equipment which may be easily started and stopped without special procedure or operator attention.

SUMMARY OF THE DISCLOSURE

The objects of the invention are achieved in apparatus comprising extruding equipment terminating in a die assembly providing a die face and extrusion orifices arranged therein in a pattern to be traversed by a cylindrical type cutter at close clearance with all areas of the face defining termini of the orifices. The essential feature of the invention is that liquid dispensing means is arranged to direct liquid essentially onto the cutting edges or knives of the cutter without any significant amount of the coolant coming into contact with the die face or even a shield thereover. Preferably, the liquid dispensing means is arranged relative to the die parts and the cutter to place coolant on the cutting edges along a portion of their path immediately downstream in the direction of rotation from the region of passage over the die face in order to maximize contact of the coolant with the blades and to utilize centrifugal force through the remainder of the revolution toward the die face to fling off excess coolant. Preferably, the cutter is constructed with a plurality of circumferentially spaced cutting edges or cutting blades with the cutter as a whole defining between each pair of adjacent blades a radially reentrant liquid-catching region or trench extending the length of the cutter. The invention further contemplates any practical construction for preventing transfer of heat from die parts to the coolant, such as a heat resistance shield for covering any areas of the die assembly except for portions of the face swept by the cutter.

The front surfaces of the cutting edges or knives of the cutter are sloped rearwardly and radially inwardly of the cutter approximately 20° with respect to a plane perpendicular to the die face. At this position of a cutting edge, its trailing surface or side is inclined at an angle approximately 25° with the plane of the die face thereby defining an angle between the front side and the trailing side of the cutting edge of approximately 45°.

DESCRIPTION OF THE PREFERRED EMBODIMENT

Figure 1:
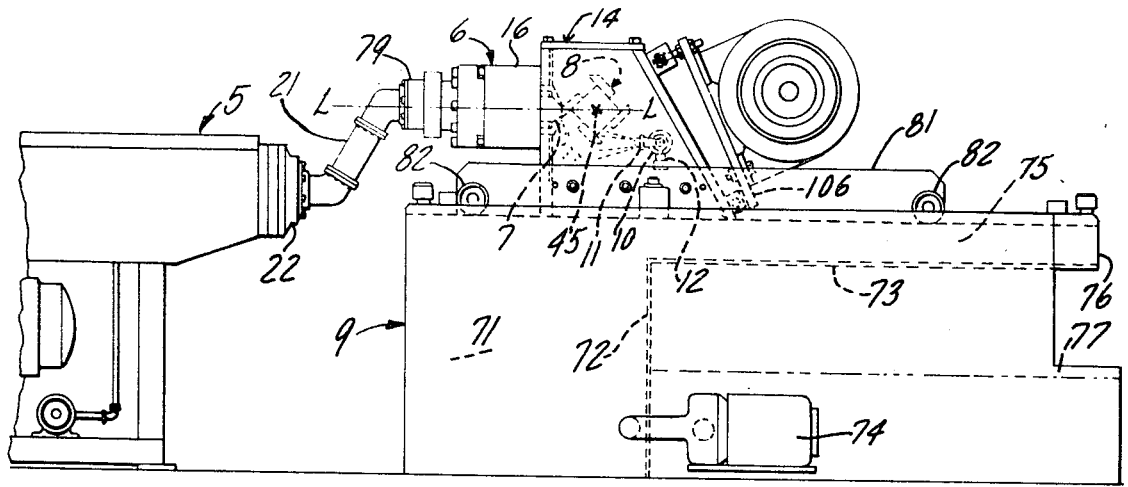
FIG. 1 is a schematic side elevation of pelletizing equipment in accordance with the invention.

In FIG. 1 is shown apparatus capable of reducing a potentially thermoplastic material, such as plastic scrap, to a plasticized condition in an extruder 5 which feeds the material into a die assembly 6 for extrusion through a die plate 7, providing a plurality of holes. The material issues from the holes as a plurality of streams or strands into a cylindrical region swept by the blades of a cylindrical cutter 8 to produce pellets which are then cooled in the cabinet 9 by water or other liquid coolant. Not shown or needed for the purposes of describing this invention is apparatus for separating the pellets from the cooling medium to the extent of drying the pellets and delivering them to a pellet collection facility. The cutting operation is performed within a movable housing 14 which in operative condition is completely enclosed except for its open underside. A liquid coolant is piped into the housing through a manifold assembly 10 supported within the housing comprising a plurality of nozzles 11 of known manufacture suitable for producing very fine droplet streams usually called "mist" and nozzles 12 suitable for directing essentially solid streams of water along different paths for the purpose of cooling newly cut pellets.

Figure 2:
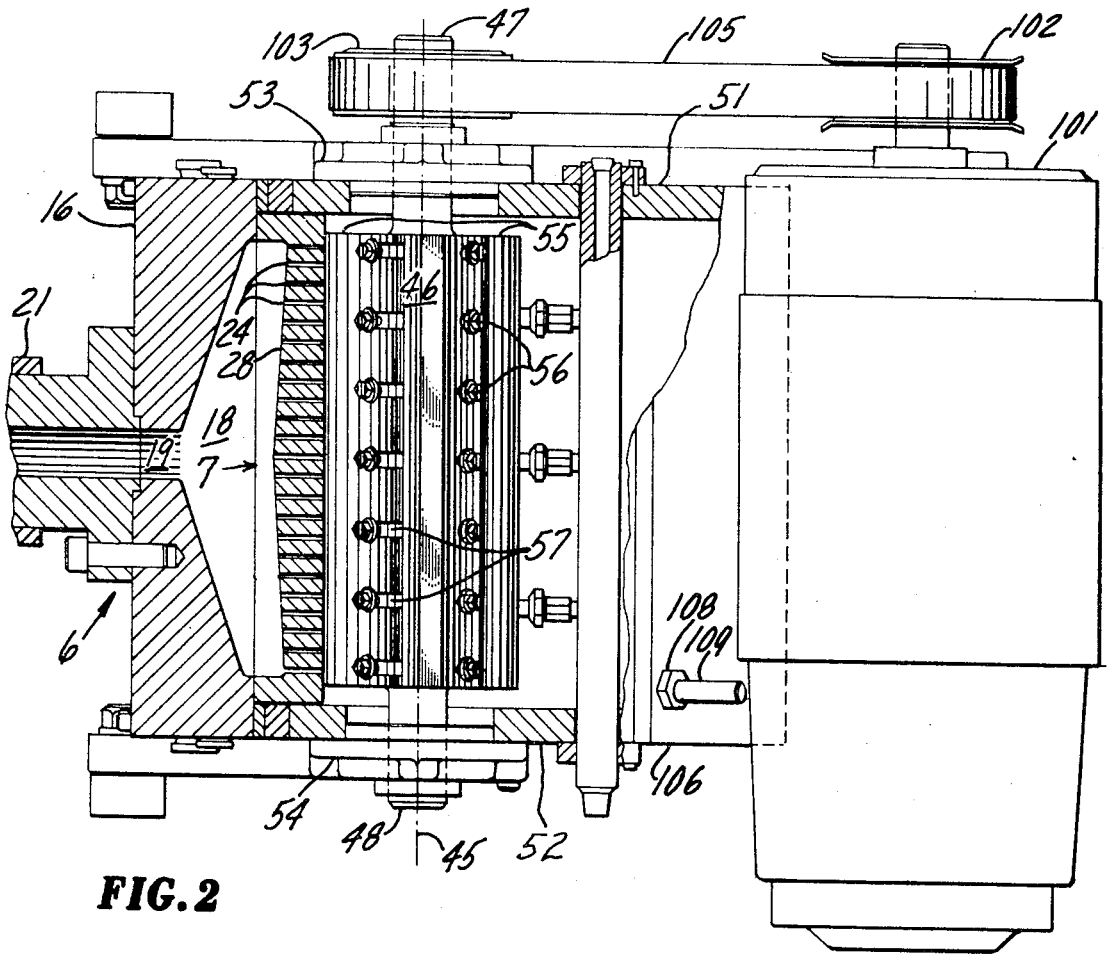
FIG. 2 is a plan view of an extruder die assembly, mechanism for cutting the extruded product, liquid dispensing manifold and nozzle assembly, and drive system for the cutter with portions sectioned away to expose interior construction.
Figure 3:
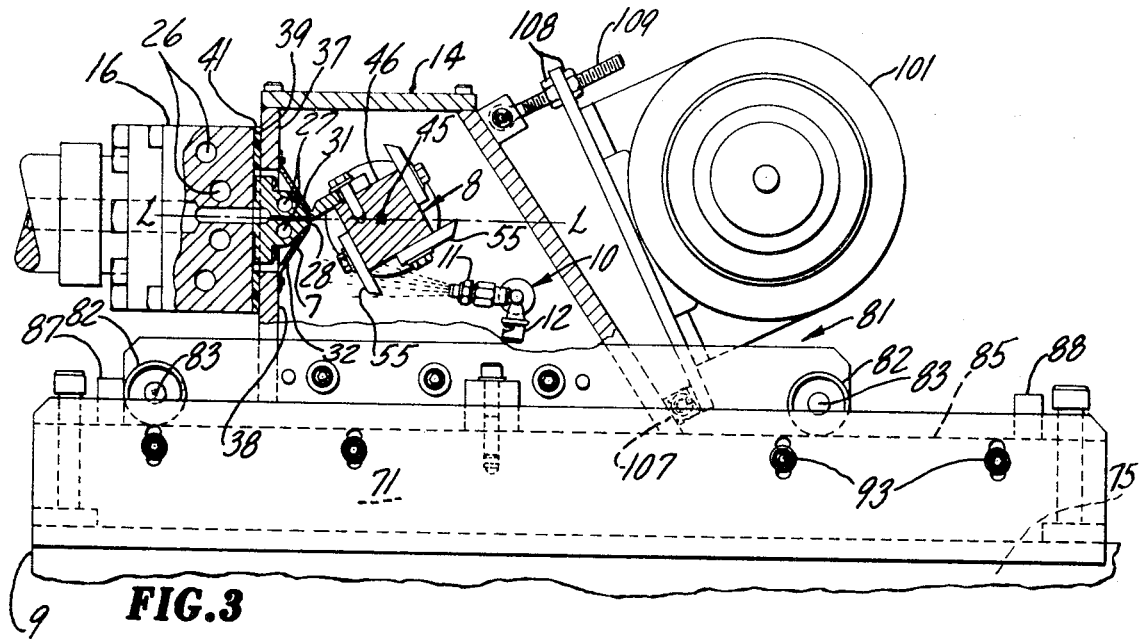
FIG. 3 is a side elevation of the apparatus shown in FIG. 2 with portions sectioned away along a vertical plane to expose interior construction.
Figure 4:
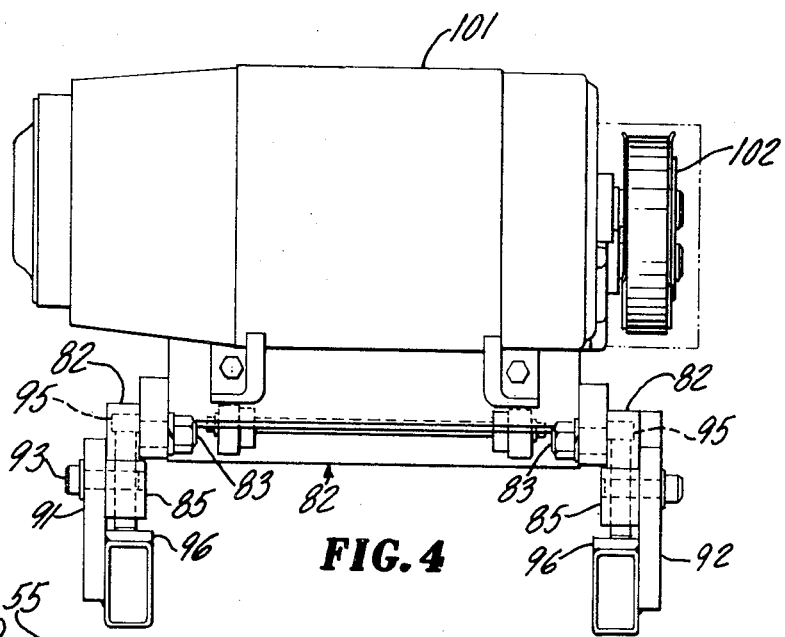
FIG. 4 is an end view of the apparatus shown in FIGS. 2 and 3.

Observing FIGS. 2 and 3, the die assembly 6 is of the fish-tail type wherein the die plate 7 and a die body 16 together define an interior region 18 of flattened funnel-like configuration. Material enters the region through a passageway 19 contiguous with the interior of a tube 21 bolted to the die body 16 and terminating at its upstream end in an adapter 22 bolted to the extruder 5. Material flows out of the region 18 through a plurality of orifices or holes 24 drilled, e.g., to ⅛ inch diameter on centers located, e.g., three-eighths inch apart on a common plane L—L bisecting the die assembly along the prevailing dimensions of the chamber 18.

For effective and precise temperature control of material passing through the die assembly, the die body 16 has rectilinear passageways 26 and the die plate 7 has passageways 27 for insertion of commercially available cartridge-type electrical heaters. Passageways 26, 27 may also be used for circulation of a heating fluid.

The die plate 7 has a planate rectilinear face 28 in which the orifices 24 terminate. As shown, the face 28 is formed on a narrow projection of the faceplate which is raised with respect to the adjacent frusto pyramidal body portion of the faceplate to an extent approximately equalling the thickness of heat and water insulating shields 31, 32 of thin sheet material. The sheet-like shields 31, 32 are shaped to seat against the projecting portion of the faceplate at shoulder surfaces 33, 34 to establish substantial sealing relation with the die plate 7. Thermal insulation of the die plate and shields is promoted by their otherwise spaced relationship with the die plate and by securement to wall elements 37, 38 of the housing 14, which are shown bolted to the same front facing surface 39 of the die body 16 on which the die plate is secured. However, the wall elements 37, 38 are separated out of direct contact with the die body by a layer of insulating material 41 and separated from the die plate as shown in FIG. 3.

The cutter 8 is shown as having an axis of rotation 45 contained within the plane L—L. The cutter comprises a base member 46 which terminates at each end in shaft portions 47, 48 in suitable bearing relation with the housing walls 51, 52 in caps 53, 54. The caps are removable for bearing replacement and for convenient removal of the cutter body 46 from the housing. The cutter base 46 is polygonal in trans-axial cross section and, as shown, has four planate surfaces to provide supporting surfaces for the four blades 55 shown secured to the base 46 as by cap screws 56. The blades project generally tengentially or radially outward from the base. The blades have slots 57 which are elongate so that they may be adjusted relative to the base 46 to vary the clearance of the blades with respect to the face 28 or to adjust for wear. Such clearance can be of the order of one thousandths to two thousandths of an inch.

Figure 5:
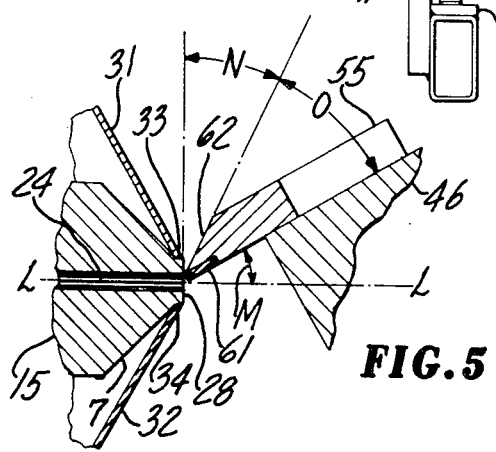
FIG. 5 is a fragmentary enlarged view in section illustrating the operative relation of a cutter blade and the strand-discharging face of the die plate shown in FIGS. 2 and 3.

As shown in FIG. 5, each blade 55 is positioned by the cutter base 46 with its front or lead surface 61 adjacent its cutting edge having an angle M of approximately 20 degrees with the plane L—L passing perpendicularly to the die face 28 when the cutting edge of the blade is in its centered cutting position in front of the die face. As a preferred construction, the cutting blade 55 has a heel surface 62 oriented at the position of the blade in FIG. 5 at an angle N of approximately 25° with respect to the plane of the die face 28. Thus, the included angle O between plate surfaces 61, 62 is approximately 45°. Angle M at 20° is found to give excellent shearing action. Angle O can be increased somewhat by decreasing angle N to increase blade life. However, angle N is desirably maintained at 15° or more in order to allow the heel surface 62 to remain in the clear of material issuing from the hole 24 as the blade sweeps past the termini of the holes in the surface 28. Failure of the surfaces 62 of the cutters to get out of the way of issuing material increases the amount of power expended in the operation of the cutter and a tendency to fouling.

As the front blade surface 61 extends along a tangent to the maximum diameter inscribed circle of the square cross section of the cutter base 46, the size of the cutter base cross section may be used to control the size of the angle M. That is to say, angle M becomes larger or smaller in accordance with an increase or decrease, respectively, in the radius at which the surface 61 is spaced from the axis 45. The projection of the cutting blades beyond the base forms radially reentrant regions between adjacent blades which collect and store a small amount of coolant sprayed thereinto which thereafter flows outwardly as acted upon by centrifugal force as a thin film from portions of the surface 61 which project beyond the base.

Liquid coolant, normally water, is applied by the manifold and nozzle assembly 10 and has as one function the discharging of coolant as a mist inwardly of the surface of revolution swept by the outward extremities of the blades 55. Preferably, the nozzles 11 of the assembly 10 are oriented to direct coolant into the reentrant regions onto the blades as well as between the blades along a tangent to a surface of revolution substantially within that of the outer edge of the blade and in a direction opposite to that of the direction of rotation of the cutter.

In fulfilling another function, the manifold 10 further comprises nozzles 12 for discharging streams which produce a substantially solid sheet of water in the embodiment shown approximately horizontally thorugh the somewhat vertical path of pellets thrown downwardly from the die face 28 by the cutter blades. A combined stream of pellets and water descends somewhat as shown in FIG. 1 into an upflowing pool of water in region 71 of the cabinet 9. A circulating current is produced in the cabinet through the partitioning thereof by walls 72, 73 and by the pumping action of a motor pump unit 74. Wall 73 partially defines a trough region 75 through which water and pellets travel toward a discharge end 76 and discharges therefrom into a conventional water and pellet separator which returns the water to the cabinet 9 through an opening 77 therein.

On servicing occasions, it is desirable to be able to disconnect the pelletizing unit, i.e., die assembly 6 and the housing 14 including the cutting equipment and dispensing manifold from the extruder 5 and move such unit away from the extruder. A break in the material handling line can be made by disconnecting the adapter 22 from the extruder body, or disconnecting the coupling flange 79 of the tube 21 from the die body 16. To facilitate movement of the pelletizing unit away from the extruder, it is made movable with respect to the cabinet 9. The various figures show the housing 14 to be attached to a carriage 81 having rollers 82 attached to four corners of the carriage frame by trunnions 83. The carriage is thereby in rolling contact with a pair of parallel spaced, horizontally extending tracks 85 secured along the inner walls of the trough-like region 75. The carriage is movable between stops 87, 88 to provide the range of travel needed for separating the pelletizer unit and the extruder. The tracks are secured to side walls 91, 92 of the cabinet by cap screws 93 extending through slots 94 in the side walls. Vertical adjustment of the tracks is provided by set screws 95 in threaded relation with the tracks and end engaging relation with upward facing pads 96.

The cutter 8 is driven, e.g., at speeds in the range of 2,000 to 2,500 r.p.m. through a motor and belt driving system comprising a motor 101 equipped with a sheave 102 in driving alignment with a sheave 103 mounted on the shaft portion 47 of the cutter. The sheaves are fitted with a belt 105 to complete the drive. The motor is mounted on an adjustable platform 106 pivotally attached to the housing along an axis 107 adjacent the lower end of the platform. Belt-tightening adjustability is achieved through repositioning nuts 108 along two eye bolts 109 attached to the housing and extending through the platform 106.

The apparatus described above may be easily and relatively quickly brought into operation by preliminarily heating the extruder through energizing of heating elements with which the extruder is conventionally equipped. As the internal extruder parts reach a proper operating temperature, the motor 101 and cutter 8 are started up and the coolant is supplied at operating pressure to the manifold assembly 10. As this happens, the cutter 8 receives liquid from the nozzles 11 as lubricant and coolant for the blades 55. Unheated plastic supply may now be fed into the extruder and processed therein to a heated fluid state for passage through the die assembly 6 and into the sweep of the revolving blades 55. There is no sticking of the severed particles of plastic because of the cool wet condition of the blades. Any momentary or instantaneous interruption in the flow of plastic, or variation in the condition of the plastic does not necessarily require operator attention for shutdown or start-up since the pelletizing which occurs at the dieface is merely dependent upon issuance of plastic therefrom. No special start-up procedure is necessary, once the plastic is moving through the extruder.

What is claimed is:

1. Apparatus for pelletizing thermoplastic resin material plasticized and extruded from an extruder comprising:

an extrusion die assembly adapted for connecting with an extruder including a dieplate having a plurality of orifices terminating in a dieface and spaced along a plane in a direction transverse to the direction of extrusion;

rotary cutter and means supporting the cutter for rotation about an axis extending along said plane in spaced relation with said face, said cutter having one or more cutting edges extending lengthwise of said axis and sweeping, during rotation of the cutter, a surface revolution in close proximity with said face and the termini of said orifices; and dispensing means supported outside said surface of revolution for directing a cooling liquid into said surface of revolution in tangential relation with a surface of revolution inwardly concentric to said first named surface of revolution to effect substantial contact with said cutting edges and in a direction such that the cooling liquid does not contact said orifices.

2. The apparatus of claim 1 comprising:
a housing enclosing said face and said cutter;
heat and liquid shielding means located outside said surface of revolution covering said face except for said orifice termini and small areas defining said orifices in said face traversed by the cutter.

3. The apparatus of claim 2 wherein:
said shielding means comprises a thin-gauge meterial; and
said orifices terminate in a narrow projection of the faceplate raised to an extent at least equalling the thickness of the shielding means with respect to the adjacent portions of the face, and the shielding means abuts the sides of said projection.

4. The apparatus of claim 1 wherein:
said assembly comprises a diebody and said plate normally secured together provides elongate bores generally parallel to said axis for receiving heating means.

5. The apparatus of claim 1 wherein:
said dispensing means comprises a manifold extending generally parallel to said axis in the clear of said cutter, and a plurality of jets mounted thereon and spaced therealong, some of said jets being mist discharging jets directed into said surface of revolution and the remainder of said jets arranged to direct a sheet of liquid transversely of the path of pellets developed in the operation of said cutter.

6. The apparatus of claim 1 wherein:
said cutter blade means defining said cutting edges and a front surface adjacent each cutting edge which has an angle of approximately 20° with respect to a plane extending perpendicularly to said dieface when its corresponding edge is centered thereover.

7. The apparatus of claim 1 wherein:
said cutter comprises a base member of trans-axial polygonal cross section to provide planate surfaces, and each of said cutting edges is defined by a blade secured to one of said planate surfaces to extend radially outwardly from said base.

8. The apparatus of claim 7 wherein:
the portion of each blade extending radially outward from said base has a front face having an angle of approximately 20° with respect to said plane perpendicular with said dieface when the blade having said face is centered over the dieface.

* * * * *

PO-1050
(5/69)

UNITED STATES PATENT OFFICE
CERTIFICATE OF CORRECTION

Patent No. 3,753,637      Dated August 21, 1973

Inventor(s) Joseph Gasior and Anthony W. Pomper

It is certified that error appears in the above-identified patent and that said Letters Patent are hereby corrected as shown below:

Column 2, line 60, change "continguous" to -- contiguous --.

Column 3, line 37, change "tengentially" to -- tangentially --.

Column 4, line 27, change "thorugh" to -- through --.

Column 5, line 46, between "surface" and "revolution" insert -- of --.

Column 6, line 33, between "cutter" and "blade" insert -- comprises --.

Signed and sealed this 27th day of November 1973.

(SEAL)
Attest:

EDWARD M. ELETCHER, JR.
Attesting Officer

RENE D. TEGTMEYER
Acting Commissioner of Patents